Oct. 13, 1936.　　　W. H. SOPER　　　2,057,217
AUTOMATIC LAWN SPRINKLER
Filed July 12, 1935　　　3 Sheets-Sheet 1
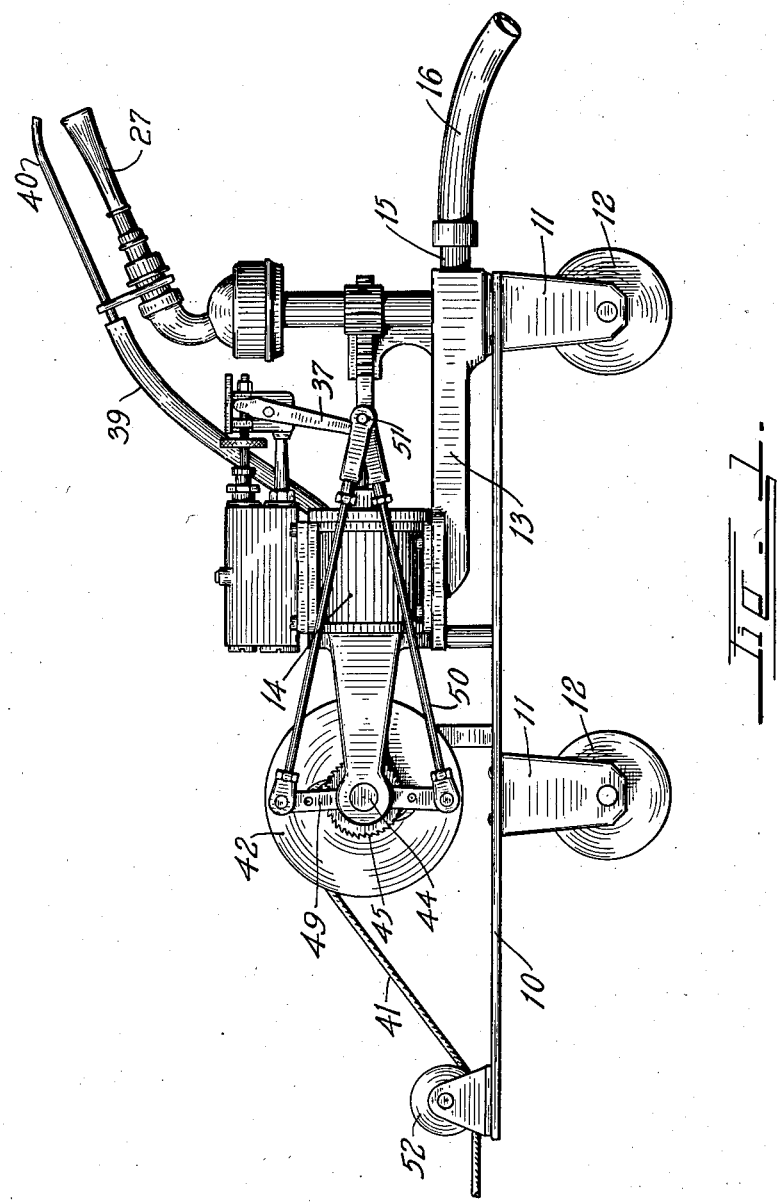
INVENTOR.
WILLIAM H. SOPER
BY
ATTORNEY.

Oct. 13, 1936.   W. H. SOPER   2,057,217
AUTOMATIC LAWN SPRINKLER
Filed July 12, 1935   3 Sheets-Sheet 2
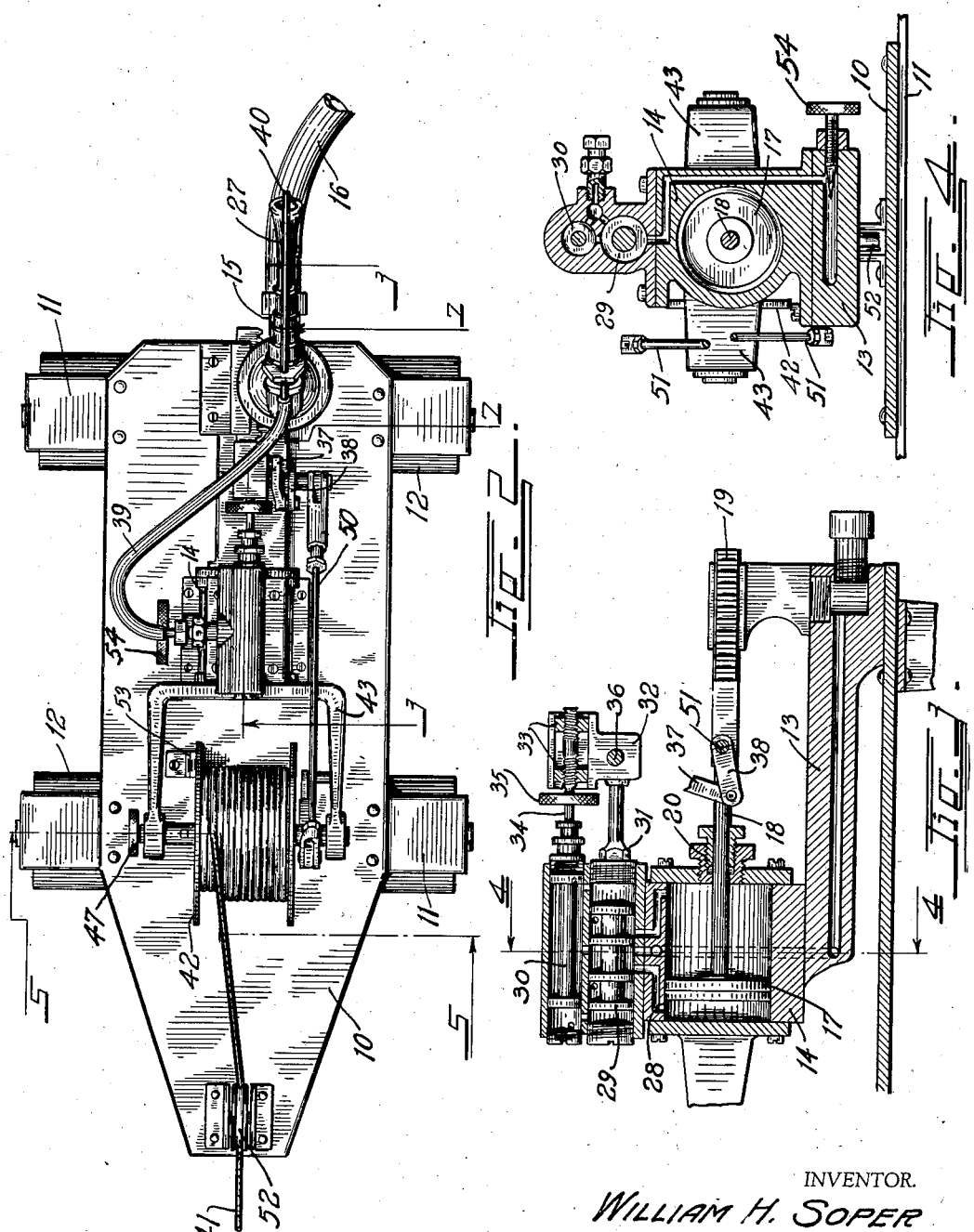
INVENTOR.
WILLIAM H. SOPER
BY
ATTORNEY.

Oct. 13, 1936.  W. H. SOPER  2,057,217
AUTOMATIC LAWN SPRINKLER
Filed July 12, 1935  3 Sheets-Sheet 3
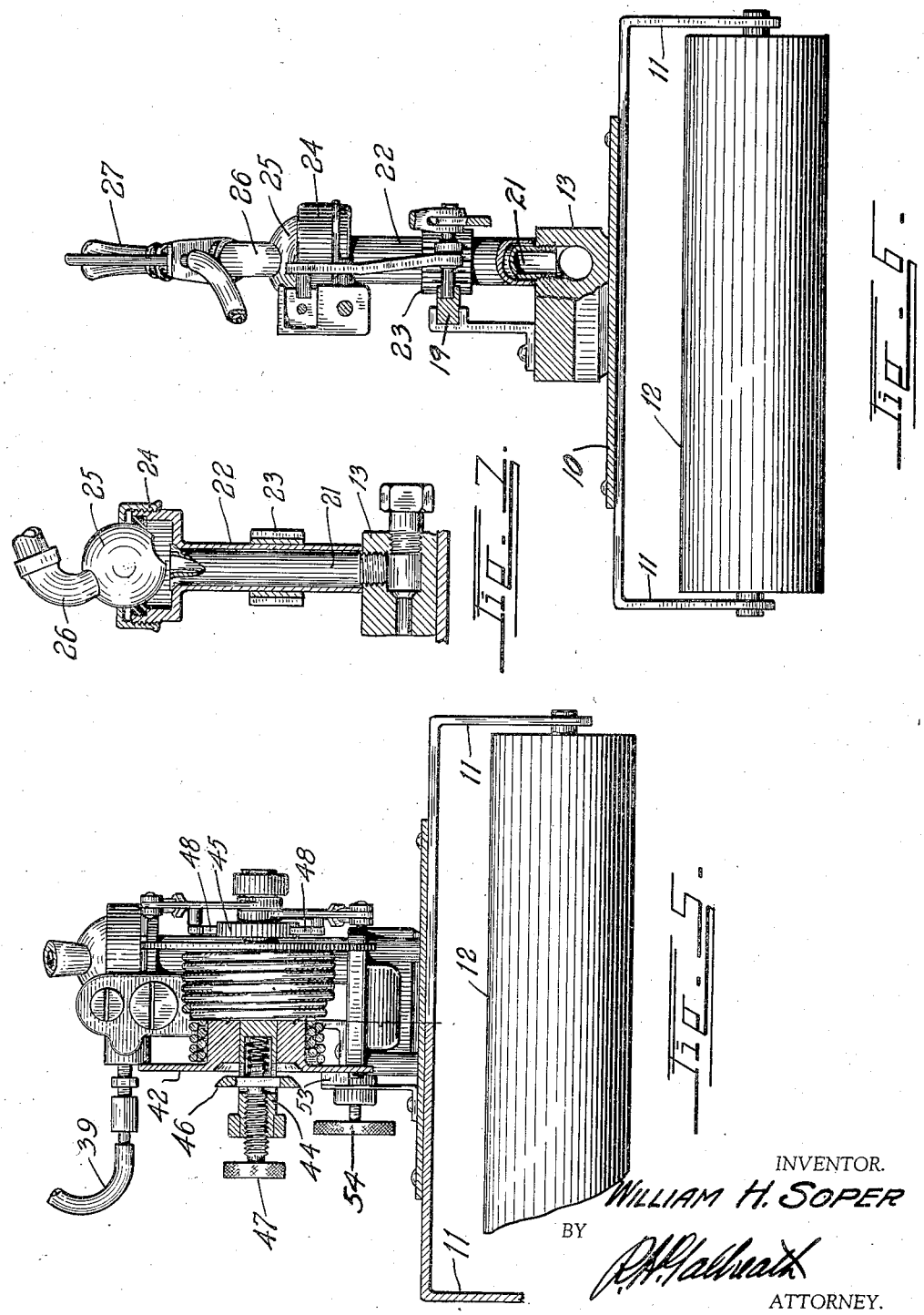
INVENTOR.
WILLIAM H. SOPER
BY
ATTORNEY.

Patented Oct. 13, 1936

2,057,217

UNITED STATES PATENT OFFICE 2,057,217

AUTOMATIC LAWN SPRINKLER

William H. Soper, Denver, Colo.

Application July 12, 1935, Serial No. 31,046

9 Claims. (Cl. 299—49)

This invention relates to an automatic lawn sprinkler, and has for its principal object the provision of a sprinkler which will travel along a predetermined path over the lawn and swing a nozzle while traveling so as to sprinkle an area, of any desired width and length.

Other objects of the invention are to so construct the device that the size and shape of the area covered and the speed of travel can be accurately and minutely adjusted.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawings and throughout the description.

In the drawings:—

Fig. 1 is a side elevation of the improved sprinkling device.

Fig. 2 is a plan view thereof.

Fig. 3 is a cross section through the operating cylinder, taken on the line 3—3, Fig. 2.

Fig. 4 is a cross section through the operating cylinder, taken on the line 4—4, Fig. 3.

Fig. 5 is a cross section of the sprinkler taken on the line 5—5, Fig. 2.

Fig. 6 is a cross section therethrough, taken on the line 6—6, Fig. 1.

Fig. 7 is a cross section through the nozzle shaft taken on the line 7—7, Fig. 2.

The improved automatic sprinkler consists of a carriage comprising a bed plate 10 mounted by means of suitable brackets 11 upon lawn rollers 12. A water manifold 13 is mounted on the plate 10 so as to support, and supply water to, an operating cylinder 14. The water is supplied to the manifold 13, from a hose nipple 15 to which an ordinary garden hose 16 may be attached. The operating cylinder 14 contains a piston 17 from which a piston rod 18 terminating in a toothed rack bar 19, extends. The piston rod 18 passes through the usual piston head stuffing gland 20.

At the forward extremity of the manifold, a tubular shaft 21 projects upwardly. A rotatable sleeve 22 surrounds the shaft 21 and is provided with a rack pinion 23 with which the teeth of the rack 19 engage. The upper extremity of the sleeve 22 terminates in a ball socket 24 in which a universal joint ball 25 is mounted. The ball 25 carries an elbow 26 from which the sprinkling nozzle 27 projects.

It can be readily seen that as the piston 17 reciprocates backward and forward in its cylinder 14, the rack 19 will impart a reciprocal rotation to the sleeve 22 so as to swing the nozzle 27 backward and forward in a predetermined arc. The elevation and direction of the nozzle 27 can be adjusted by loosening the ball socket 24 and turning the ball 25 to any desired position therein.

The piston is caused to reciprocate by water pressure from the manifold 13 which also supplies the water to the nozzle 27. The top of the cylinder 14 is formed with slide valve passages 28 which are opened to the source of pressure or to the exhaust by means of a pressure actuated slide valve spool 29. The movements of the slide valve spool 29 are controlled by means of a second mechanically operated slide valve spool 30.

When the valve spool 30 is at one extremity of its movement, it will admit pressure to one of the extremities of the valve spool 29, causing it to move in a direction to control the water flow to the cylinder 14 so as to move the piston 17 in one direction. And when the valve spool 30 is at the opposite extremity of its movement, it will admit pressure to the opposite extremity of the valve spool 29, causing it to move in the reverse direction to reverse the intake and discharge of the cylinder 14. Therefor it can be readily seen that movement of the second valve spool 30 in one direction will cause a corresponding movement of the piston 17 in the opposite direction.

The spool 30 is operated by the following mechanism: a bracket stud 31 projects from the cylinder containing the valve spool 29. This stud supports a bracket member 32 which provides a track for two slide blocks 33. The slide blocks 33 are threaded up on right and left hand threads respectively, on a valve rod 34 extending from the spool 30. Thus rotation of the valve rod 34 acts to bring the blocks 33 toward or away from each other. A knurled thumb disc 35 is provided to facilitate rotation of the rod 34.

The bracket 32 also supports a pivot 36 for a rocker arm 37. The upper extremity of the rocker arm 37 functions between the blocks 33. The lower extremity thereof is connected by means of a suitable link 38 to a stud 51 on the rack 19.

Thus, as the rack 19 reciprocates, it will impart a reciprocation to the upper extremity of the rocker arm 37 between the blocks 33. If the blocks 33 are close together, this reciprocation will be immediately transferred to the valve 30, causing the piston 17 to travel in a very short stroke. If the blocks 33 are wide apart, reciprocation will be delayed in transferring to the spool 30 so that the piston 17 will travel in a relatively long stroke. Therefor, by adjustment of the knurled disc 35, the length of the arc of swing of the nozzle 27 can be accurately adjusted.

The exhaust or discharge water from the cylinder 14 is conducted by means of a flexible hose 39 to a spout 40 which places the discharging water into the stream flowing from the nozzle 27.

The propulsion of the sprinkler is accomplished by means of a flexible cable 41 coiled about a cable reel 42. The cable reel is mounted on a ratchet shaft 44 journalled in a bracket 43 formed on the rear head of the cylinder 14. The ratchet shaft 44 is provided with a suitable ratchet wheel 45. The reel 42 can be connected to the ratchet shaft 44 when desired by means of a clutch 46 actuated from a clutch screw 47.

The ratchet wheel is rotated by two pawls 48, each of which is carried on one of a pair of pawl arms 49. One of the pawl arms extends upwardly from the shaft 44, the other downwardly therefrom. The extremities of the two pawl arms are connected by means of connecting rods 50 with the stud 51 projecting from the rack bar 19. The cable 41 passes through a guide pulley 52 at the rear extremity of the bed plate 10.

It can be seen that as the rack bar 19 reciprocates, it will actuate the pawl arms 49 to cause the pawls 48 to alternately engage the teeth of the ratchet 45 so as to rotate the reel 42 and wind in the cable 41.

In use, the outer extremity of the cable is attached to a suitable stake placed in the lawn at the extremity of the desired length of travel. It can be readily seen that when the water pressure reaches the device, the nozzle will swing back and forth, and the cable reel will reel in the cable so as to continuously pull the device along on its rollers 12. To release the cable for withdrawing it to a new position, it is only necessary to loosen the clutch 46 by means of the clutch screw 47. A spring actuated brake 53 bears against the cable roll to prevent accidental uncoiling of the cable.

The speed of the mechanism can be controlled by means of a needle valve 54 which controls the flow to the cylinder 14. The speed of travel can be reduced without reducing the speed of the nozzle swing by lifting one of the pawls 48 out of contact with the ratchet wheel.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. An automatic lawn sprinkling device comprising: a supporting member; a water manifold mounted on said supporting member; a cylinder communicating with said water manifold; a hollow nozzle shaft extending vertically from and communicating with said water manifold; a tubular sleeve surrounding said nozzle shaft; a nozzle carried by said sleeve; a piston in said cylinder; a piston rod extending from said piston; a rack bar carried by said piston rod; and a pinion carried by said sleeve in mesh with said rack bar so that reciprocation of said piston will swing said nozzle.

2. An automatic lawn sprinkler comprising: a horizontally positioned water manifold; means for attaching a feed hose to said manifold; a power cylinder supported at one extremity of said manifold and communicating therewith; a tubular shaft vertically supported by said manifold and communicating therewith; a rotatable sleeve surrounding said shaft; a pinion formed on said sleeve; a piston actuated by water pressure in said cylinder; a piston rod extending from said piston and from said cylinder; a toothed rack forming a continuation of said piston rod and meshing with said pinion; and means for mounting a nozzle upon said sleeve above said post.

3. An automatic lawn sprinkler comprising: a horizontally positioned water manifold; means for attaching a feed hose to said manifold; a power cylinder supported at one extremity of said manifold and communicating therewith; a tubular shaft vertically supported by said manifold and communicating therewith; a rotatable sleeve surrounding said shaft; a pinion formed on said sleeve; a piston actuated by water pressure in said cylinder; a piston rod extending from said piston and from said cylinder; a toothed rack forming a continuation of said piston rod and meshing with said pinion; an enlarged upper extremity on said sleeve above the upper extremity of said shaft; a universal joint mounted in said enlarged extremity; and a nozzle supported by said universal joint so that it may be directed in any desired direction and so that it will be swung by the reciprocation of said sleeve.

4. An automatic lawn sprinkler comprising: a horizontally positioned water manifold; means for attaching a feed hose to said manifold; a power cylinder supported at one extremity of said manifold and communicating therewith; a tubular shaft vertically supported by said manifold and communicating therewith; a rotatable sleeve surrounding said shaft; a pinion formed on said sleeve; a piston actuated by water pressure in said cylinder; a piston rod extending from said piston and from said cylinder; a toothed rack forming a continuation of said piston rod and meshing with said pinion; means for mounting a nozzle upon said sleeve above said post; a slide valve for controlling the flow of water to said cylinder; a lever for actuating said slide valve; and means on said rack bar for actuating said lever.

5. An automatic lawn sprinkler comprising: a horizontally positioned water manifold; means for attaching a feed hose to said manifold; a power cylinder supported at one extremity of said manifold and communicating therewith; a tubular shaft vertically supported by said manifold and communicating therewith; a rotatable sleeve surrounding said shaft; a pinion formed on said sleeve; a piston actuated by water pressure in said cylinder; a piston rod extending from said piston and from said cylinder; a toothed rack forming a continuation of said piston rod and meshing with said pinion; means for mounting a nozzle upon said sleeve above said post; a slide valve for controlling the flow of water to said cylinder; a yoke member supported from said cylinder; a cable reel journalled in said yoke; a ratchet for actuating said reel; and means for actuating said ratchet and said slide valve from said rack bar.

6. An automatic lawn sprinkler comprising: a horizontally positioned water manifold; means for attaching a feed hose to said manifold; a power cylinder supported at one extremity of said manifold and communicating therewith; a tubular shaft vertically supported by said manifold and communicating therewith; a rotatable sleeve surrounding said shaft; a pinion formed on said sleeve; a piston actuated by water pressure in said cylinder; a piston rod extending from said piston and from said cylinder; a toothed rack forming a continuation of said piston rod and meshing with said pinion; means for mounting a nozzle upon said sleeve above said post; a slide valve for controlling the flow of water to said cylinder; a yoke member supported from said cylinder; a cable reel journalled in said yoke; a ratchet for actuating said reel; means for actuating said ratchet and said slide valve from said rack bar; and clutch means for connecting and disconnecting said ratchet to and from said cable reel.

7. An automatic lawn sprinkler comprising: a horizontally positioned water manifold; means for attaching a feed hose to said manifold; a power cylinder supported at one extremity of said manifold and communicating therewith; a tubular shaft vertically supported by said manifold and communicating therewith; a rotatable sleeve surrounding said shaft; a pinion formed on said sleeve; a piston actuated by water pressure in said cylinder; a piston rod extending from said piston and from said cylinder; a toothed rack forming a continuation of said piston rod and meshing with said pinion; means for mounting a nozzle upon said sleeve above said post; a bed plate; and means for supporting said manifold from said bed plate.

8. An automatic lawn sprinkler comprising: a horizontally positioned water manifold; means for attaching a feed hose to said manifold; a power cylinder supported at one extremity of said manifold and communicating therewith; a tubular shaft vertically supported by said manifold and communicating therewith; a rotatable sleeve surrounding said shaft; a pinion formed on said sleeve; a piston actuated by water pressure in said cylinder; a piston rod extending from said piston and from said cylinder; a toothed rack forming a continuation of said piston rod and meshing with said pinion; means for mounting a nozzle upon said sleeve above said post; a slide valve actuated by the movement of said piston rod; and a floating valve actuated by said slide valve for controlling the flow of water to said cylinder.

9. An automatic lawn sprinkler comprising: a horizontally positioned water manifold; means for attaching a feed hose to said manifold; a power cylinder supported at one extremity of said manifold and communicating therewith; a tubular shaft vertically supported by said manifold and communicating therewith; a rotatable sleeve surrounding said shaft; a pinion formed on said sleeve; a piston actuated by water pressure in said cylinder; a piston rod extending from said piston and from said cylinder; a toothed rack forming a continuation of said piston rod and meshing with said pinion; means for mounting a nozzle upon said sleeve above said post; and means for carrying the exhaust water from said cylinder into the stream flowing from said nozzle.

WILLIAM H. SOPER.